…

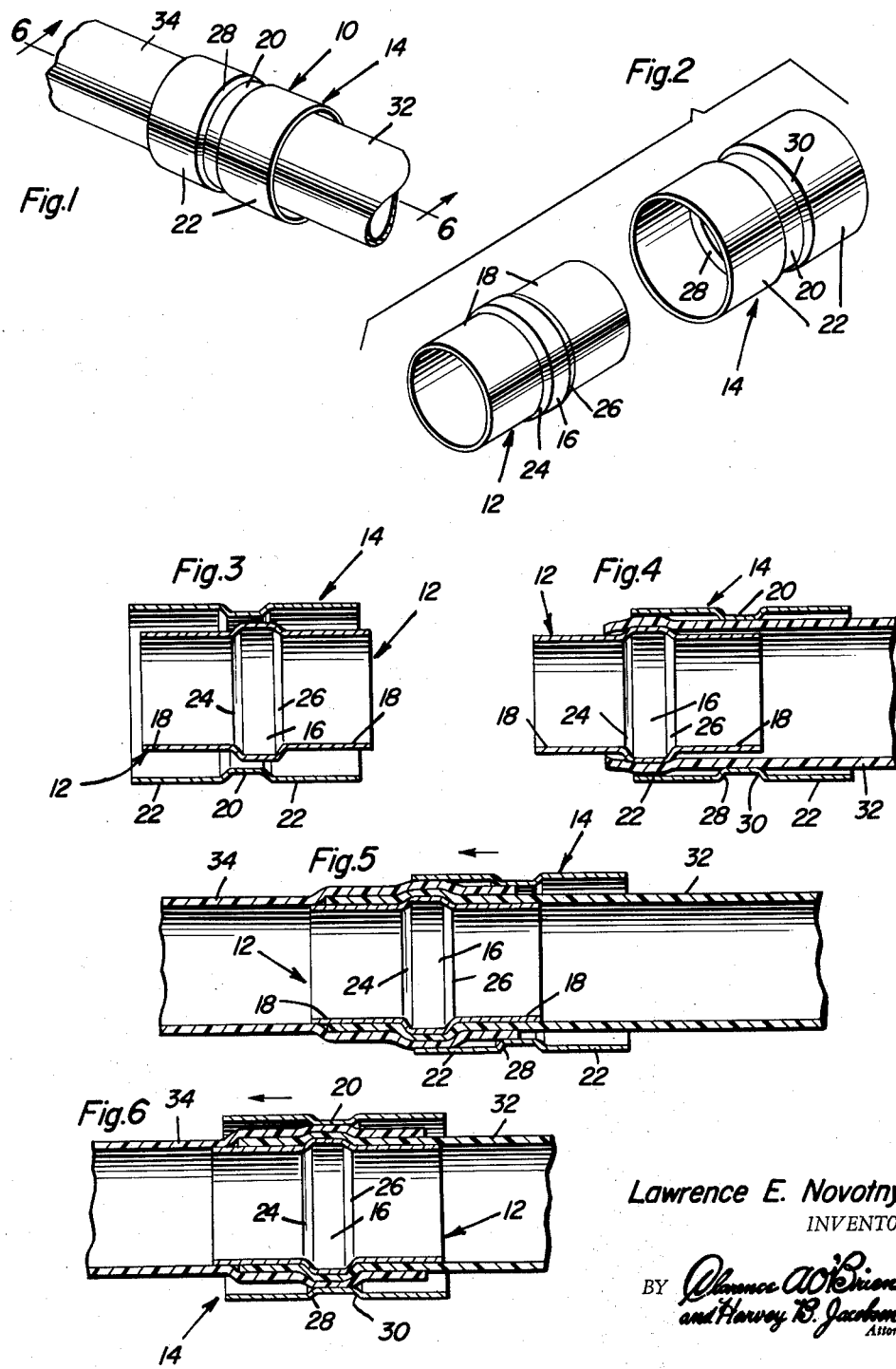

United States Patent Office 3,087,747
Patented Apr. 30, 1963

3,087,747
CONNECTOR FOR RESILIENT TUBING
Lawrence E. Novotny, 212 Sugar Road, Pharr, Tex.
Filed Nov. 10, 1960, Ser. No. 68,544
2 Claims. (Cl. 285—398)

This invention relates to a novel and useful connector for resilient tubing. The connector of the instant invention is particularly well adapted for joining aligned adjacent ends of resilient tubing sections such as plastic garden hose sections and other flexible conduits.

With the introduction of plastics as a material for constructing tubing, a need has arisen for the provision of a connector member particularly well adapted for joining adjacent ends of plastic tubing. Plastic tubing is not only used in the construction of garden hose but is also used for many other purposes such as irrigation tubing, fuel line tubing and many various other types of tubing for transporting solid as well as fluid materials. The tubing connector of the instant invention may not only be used in the construction of tubing lines for joining shorter sections of tubing in order to form continuous sections of tubing, but it may also be used to repair damaged portions of resilient tubing by merely removing the damaged portion of the tubing and then using the connector to join the sections from between which the damaged section of tubing was removed.

In the past many types of tubing connectors have been devised and most have included a relatively large number of parts requiring at least one tool of either special or conventional design for installing the tube connector between adjacent ends of tubing sections. These previous tubing connectors are for the most part efficient in joining adjacent tubing sections after they have been once installed, but the necessity of the use of either conventional or special tools in connection with the tubing connector when joining two adjacent tubing sections comprises a major drawback.

Accordingly, it is the main object of this invention to provide a tubing connector which may readily be used to join adjacent ends of resilient tubing sections without the use of either conventional or special tools.

A further object of this invention, in accordance with the preceding object is to provide a tubing connector having a minimum number of parts while still being capable of effectively joining adjacent resilient tubing sections.

A still further object of this invention, in accordance with the preceding objects, is to provide a tubing connector for joining adjacent ends of resilient tubing sections which may, after being utilized to join the adjacent resilient tubing sections, be subsequently removed from the adjacent resilient tubing sections in order to disconnect the same.

Still another object of this invention, in accordance with the immediately preceding object, is to provide a tubing connector which will not irreparably damage adjacent resilient tubing sections while being utilized to connect the latter so that the two tubing sections may subsequently be disconnected without the tubing connector having left evidence that the two tubing sections were ever joined together.

A final object of this invention to be specifically enumerated herein is to provide a connector for joining adjacent resilient tubing sections which will conform to conventional forms of manufacture, be of simple construction and easy to install so as to provide a device that will be economically feasible, long lasting and capable of being utilized to join adjacent resilient tubing sections by substantially every person having a minimum of mechanical knowledge.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspecitve view of the tubing connector shown being utilized to connect adjacent ends of alined resilient tubing sections;

FIGURE 2 is an exploded perspective view of the tubing connector on somewhat of an enlarged scale;

FIGURE 3 is a vertical longitudinal sectional view of the tubing connector shown with the two parts thereof disposed substantially in the positions they would assume while joining adjacent ends of resilient tubing sections;

FIGURE 4 is a vertical longitudinal sectional view of the two pieces of the tubing connector disposed in position in preparation for joining adjacent ends of tubing sections, the end of one tubing section being disposed about one of the pieces of the tubing connector;

FIGURE 5 is a longitudinal vertical sectional view similar to that of FIGURE 4 but showing the other resilient tubing end inserted in the other part of the tubing connector in preparation before the final step of securing the tubing sections together; and FIGURE 6 is a longitudinal vertical sectional view of the tubing connector showing the two pieces thereof in proper orientation with the associated ends of the resilient tubing sections the connector is being utilized to join and with the two pieces of the connector being positioned relative to each other as they would be just prior to the completion of the final step of joining two resilient tubing sections.

Referring now more specifically to the drawings the numeral 10 generally designates the tubing connector of the instant invention. The tubing connector 10 includes an inner tubular or cylindrical member generally designated by the reference numeral 12 and an outer cylindrical or tubing member generally designated by the reference numeral 14. The inner member or tube 12 includes a diametrically enlarged cylindrical intermediate or major diameter portion 16 and minor diameter portions 18 while the outer member or tube 14 includes a diametrically reduced cylindrical intermediate or minor diameter portion 20 and a pair of major diameter portions 22. It will be noted that the portions 16 and 20 are formed intermediate the opposite ends of the members 12 and 14 respectively although it is to be understood that they may be formed on either end of the members 12 and 14. Additionally, the members 12 and 14 with their corresponding major and minor diameter portions are cylindrical and it is to be understood that they may assume other configurations either of constant diameter throughout the length of the various corresponding portions or of varying diameters throughout the length of those corresponding portions.

The intermediate portion 16 is defined by a pair of oppositely inclined frusto-conical shoulder portions 24 and 26 while the intermediate portion 20 is defined by a pair of oppositely inclined frusto-conical shoulder portions 28 and 30.

In operation, the inner member 12 is inserted in one end of a tubing section 32 as illustrated in FIGURE 4 after the outer member 14 has been telescoped over that tubing section 32. The end of another tubing section 34 is then telescoped over the end of the tubing 32 and through the outer member 14 as illustrated in FIGURE 5. It is to be noted that the intermediate portion 20 has an inner diameter corresponding to the outer diameter of the tubing section 34 and that the intermediate section 16 has an outer diameter slightly greater than the inner diameter of the tubing section 32.

Also, the outer diameter of the intermediate section 16 could be substantially equal to the inner diameter of the tubing section 32 but it will be noted that by providing the intermediate section 16 with a larger outer diameter than the inner diameter of the tubing section 32 that the adjacent end of the tubing section 32 is diametrically reduced because of the adjacent diametrically enlarged portion disposed about the intermediate portion 16. By automatically forming a diametrically reduced end on the tubing section 32, it may readily be telescoped within the adjacent end of the tubing section 34 as can best be seen in FIGURES 4 and 5 of the drawings.

After the members 12 and 14 have been engaged with the tubing sections 32 and 34 respectively, the members 12 and 14 and the tubing sections 32 and 34 are moved axially toward each other as illustrated in FIGURE 5 of the drawings. The members 12 and 14 and the tubing sections 32 and 34 respectively are then moved further toward each other as illustrated in FIGURE 6 of the drawings until the members 12 and 14 are substantially diametrically alined. During this final movement of the members 12 and 14 toward diametrically alined positions, the shoulder portions 26 and 28 of the sections 12 and 14 respectively comprise cam surfaces for radially compressing the overlapped ends of the tubing sections 32 and 34 between the members 12 and 14.

With the particular tubing connector 10 illustrated in the drawings it will be noted that the intermediate portions 16 and 20 of the members 12 and 14 respectively compress the double thickness of the overlapped ends of the tubing sections 32 and 34 to a total wall thickness substantially equal to the normal wall thickness of one of the sections 32 and 34. Therefore, an extremely tight juncture between the overlapped ends of the tubing sections 32 and 34 is formed and after the tubing sections have been joined as illustrated in FIGURE 6 attempts to pull the opposite ends of the tubing sections 32 and 34 apart will merely tighten the connection between the two sections 32 and 34. It also will be noted that the outer member 14, with the exception of the reduced intermediate portion 20 thereof, is spaced concentrically from the connected tubing sections.

In order to release the connection between the tubing sections 32 and 34, the initial movement of the members 12 and 14 toward each other to join the tubing sections 32 and 34 is reversed whereupon the connection between the two tubing sections 32 and 34 will be released. Inasmuch as the connector 10 is specifically designed to connect adjacent ends of resilient and deformable tubing sections such as sections of plastic garden hose and the like, the radially compressed portions of the tubing sections 32 and 34 will in time assume their normal wall thickness. This process of returning the adjacent ends of the tubing sections 32 and 34 may be hastened by the use of applied heat in most cases where resilient plastic tubing sections have been previously joined together by the connector 10.

The foregoing is considered as illustrative only of the principles of the invention. Further, since numerous modifications and changes will readily occur to those skilled in the art, it is not desired to limit the invention to the exact construction and operation shown and described, and accordingly all suitable modification and equivalents may be resorted to, falling within the scope of the invention as claimed.

What is claimed as new is as follows:

1. A conduit comprising, in combination, a pair of flexible tube sections having one end portion telescopically connected, a rigid inner tube in the telescoped end portions of the sections, and a rigid outer tube slidable longitudinally on the telescoped end portions of the sections, said inner and outer tubes comprising, respectively, externally enlarged and internally reduced, coacting intermediate portions adapted to be brought into spaced concentric relation with the sections therebetween in response to relative longitudinal movement of the tubes, said sections having a normal combined thickness exceeding the spacing of the intermediate tube portions to be radially compressed and frictionally anchored therebetween when said intermediate tube portions are brought into said spaced, concentric relation to each other, said intermediate tube portions being generally cylindrical and including generally frusto-conical end portions.

2. The combination of claim 1, wherein the end portions of said outer tube are spaced concentrically from the sections.

References Cited in the file of this patent

UNITED STATES PATENTS

| | | |
|---|---|---|
| 2,047,714 | Smith | July 14, 1936 |
| 2,768,844 | Schadeberg | Oct. 30, 1956 |
| 2,824,575 | Rosen | Feb. 25, 1958 |
| 2,978,533 | Colbert | Apr. 4, 1961 |